United States Patent
Armstrong et al.

(10) Patent No.: US 9,960,521 B2
(45) Date of Patent: May 1, 2018

(54) CONNECTOR FOR FLUIDLY SEALING AN APERTURE OF A PROTECTIVE CASE

(71) Applicant: Otter Products LLC, Fort Collins, CO (US)

(72) Inventors: Peter S. Armstrong, Poway, CA (US); Francisco Garcia, San Diego, CA (US); Jonathan Arpin, San Diego, CA (US); Warren M. Terry, Poway, CA (US)

(73) Assignee: Otter Products, LLC, Fort Collins, CO (US)

( * ) Notice: Subject to any disclaimer, the term of this patent is extended or adjusted under 35 U.S.C. 154(b) by 0 days. days.

(21) Appl. No.: 15/419,844

(22) Filed: Jan. 30, 2017

(65) Prior Publication Data
US 2017/0244194 A1    Aug. 24, 2017

Related U.S. Application Data

(60) Provisional application No. 62/299,292, filed on Feb. 24, 2016.

(51) Int. Cl.
*H01R 13/52* (2006.01)
*A45C 11/00* (2006.01)
(Continued)

(52) U.S. Cl.
CPC .......... *H01R 13/5202* (2013.01); *A45C 11/00* (2013.01); *G06F 1/1626* (2013.01);
(Continued)

(58) Field of Classification Search
None
See application file for complete search history.

(56) References Cited

U.S. PATENT DOCUMENTS 2,164,221 A   6/1939   Hoover et al.
2,392,787 A   1/1946   Edmond
(Continued)

FOREIGN PATENT DOCUMENTS

EP   1018680 A2   7/2000
EP   1939263 A1   7/2008
(Continued)

OTHER PUBLICATIONS

PCT Intl. Search Report and Written Opinion for PCT Appn. No. PCT/US2011/056040, dated Jul. 12, 2012.
Results for Invalidity Search for U.S. Pat. No. 6,995,976.

*Primary Examiner* — Tho D Ta

(57) ABSTRACT

A protective case for a portable electronic device is provided. The portable electronic device has a device connector for transmission of data and/or power between the device connector and a data and/or power source via a reciprocal connector assembly. The case includes an aperture disposed proximate the device connector of the installed portable electronic device, the aperture passing between an outer surface and an inner surface of the case and defined by a surface between the outer and inner surfaces, the aperture having a circumference; and a compliant seal surrounding the circumference of the aperture, the compliant seal to interface with at least a portion of the backshell portion of the reciprocal connector assembly to seal the aperture when the reciprocal connector assembly is inserted through the aperture to interface with the device connector of the installed portable electronic device.

17 Claims, 12 Drawing Sheets

(51) Int. Cl.
  *G06F 1/16* (2006.01)
  *H01R 13/516* (2006.01)
(52) U.S. Cl.
  CPC ....... *H01R 13/516* (2013.01); *H01R 13/5219* (2013.01); *A45C 2011/001* (2013.01); *A45C 2011/002* (2013.01); *A45C 2011/003* (2013.01)

(56) References Cited

U.S. PATENT DOCUMENTS

| | | |
|---|---|---|
| 2,851,670 A | 9/1958 | Senior |
| 3,023,885 A | 3/1962 | Kindseth |
| 3,143,384 A | 8/1964 | Senior |
| 3,184,847 A | 5/1965 | Rosen |
| 3,482,895 A | 12/1969 | Becklin |
| 3,521,216 A | 7/1970 | Jerair |
| 3,590,988 A | 7/1971 | Douglass |
| 3,665,991 A | 5/1972 | Gillemot et al. |
| 3,689,866 A | 9/1972 | William |
| 3,832,725 A | 8/1974 | Cook |
| 3,922,477 A | 11/1975 | Glowacz |
| 4,097,878 A | 6/1978 | Cramer |
| 4,298,204 A | 11/1981 | Jinkins |
| 4,312,580 A | 1/1982 | Schwomma et al. |
| 4,335,930 A | 6/1982 | Feldman |
| 4,352,968 A | 10/1982 | Pounds |
| 4,375,323 A | 3/1983 | Inagaki et al. |
| 4,383,743 A | 5/1983 | Nozawa et al. |
| 4,418,830 A | 12/1983 | Dzung et al. |
| 4,420,078 A | 12/1983 | Belt et al. |
| 4,440,464 A | 4/1984 | Spinner |
| 4,546,874 A | 10/1985 | Kirchhan |
| 4,584,718 A | 4/1986 | Fuller |
| 4,649,453 A | 3/1987 | Iwasawa |
| 4,658,956 A | 4/1987 | Takeda et al. |
| 4,683,587 A | 7/1987 | Silverman |
| 4,686,332 A | 8/1987 | Greanias et al. |
| 4,703,161 A | 10/1987 | McLean |
| 4,712,657 A | 12/1987 | Myers et al. |
| 4,733,776 A | 3/1988 | Ward |
| 4,762,227 A | 8/1988 | Patterson |
| 4,803,504 A | 2/1989 | Maeno et al. |
| 4,836,256 A | 6/1989 | Meliconi |
| 4,942,514 A | 7/1990 | Miyagaki et al. |
| 4,963,902 A | 10/1990 | Fukahori |
| 4,977,483 A | 12/1990 | Perretta |
| 4,994,829 A | 2/1991 | Tsukamoto |
| 5,002,184 A | 3/1991 | Lloyd |
| 5,025,921 A | 6/1991 | Gasparaitis et al. |
| 5,087,934 A | 2/1992 | Johnson |
| 5,092,458 A | 3/1992 | Yokoyama |
| 5,092,459 A | 3/1992 | Uljanic et al. |
| 5,123,044 A | 6/1992 | Tate |
| 5,167,522 A | 12/1992 | Behning |
| 5,175,873 A | 12/1992 | Goldenberg et al. |
| 5,177,515 A | 1/1993 | Tsukamoto |
| 5,219,067 A | 6/1993 | Lima et al. |
| 5,231,381 A | 7/1993 | Duwaer |
| 5,233,502 A | 8/1993 | Beatty et al. |
| 5,239,323 A | 8/1993 | Johnson |
| 5,239,324 A | 8/1993 | Ohmura et al. |
| 5,258,592 A | 11/1993 | Nishikawa et al. |
| 5,285,894 A | 2/1994 | Kamata et al. |
| 5,294,988 A | 3/1994 | Wakabayashi et al. |
| 5,305,032 A | 4/1994 | Arai |
| 5,336,896 A | 8/1994 | Katz |
| 5,360,108 A | 11/1994 | Alagia |
| 5,368,159 A | 11/1994 | Doria |
| 5,380,968 A | 1/1995 | Morse |
| 5,383,091 A | 1/1995 | Snell |
| 5,386,084 A | 1/1995 | Risko |
| 5,388,691 A | 2/1995 | White |
| 5,388,692 A | 2/1995 | Withrow et al. |
| 5,423,692 A | 6/1995 | Francis |
| 5,499,713 A | 3/1996 | Huffer |
| 5,505,328 A | 4/1996 | Stribiak |
| 5,508,479 A | 4/1996 | Schooley |
| 5,541,813 A | 7/1996 | Satoh et al. |
| RE35,318 E | 8/1996 | Warman |
| 5,548,306 A | 8/1996 | Yates et al. |
| 5,573,164 A | 11/1996 | Law |
| 5,583,742 A | 12/1996 | Noda et al. |
| 5,584,054 A | 12/1996 | Tyneski et al. |
| 5,586,002 A | 12/1996 | Notarianni |
| 5,586,176 A | 12/1996 | Peck |
| 5,590,760 A | 1/1997 | Astarb |
| 5,610,655 A | 3/1997 | Wakabayashi et al. |
| 5,613,237 A | 3/1997 | Bent et al. |
| 5,632,373 A | 5/1997 | Kumar et al. |
| 5,636,101 A | 6/1997 | Bonsall et al. |
| 5,648,757 A | 7/1997 | Vernace et al. |
| 5,660,566 A | 8/1997 | Ohsumi |
| 5,669,004 A | 9/1997 | Sellers |
| 5,681,122 A | 10/1997 | Burke |
| 5,707,757 A | 1/1998 | Lee |
| 5,713,048 A | 1/1998 | Hayakawa |
| 5,713,466 A | 2/1998 | Tajima |
| 5,762,510 A * | 6/1998 | Taniguchi .......... H01R 13/5202 439/271 |
| 5,845,803 A | 12/1998 | Saito et al. |
| 5,850,915 A | 12/1998 | Tajima |
| 5,889,730 A | 3/1999 | May |
| 5,907,721 A | 5/1999 | Schelling et al. |
| 5,946,501 A | 8/1999 | Hayakawa |
| 5,956,291 A | 9/1999 | Nehemiah et al. |
| 5,982,520 A | 11/1999 | Weiser et al. |
| 5,990,874 A | 11/1999 | Tsumura et al. |
| 6,031,524 A | 2/2000 | Kunert |
| 6,041,924 A | 3/2000 | Tajima |
| 6,049,813 A | 4/2000 | Danielson et al. |
| 6,068,119 A | 5/2000 | Derr et al. |
| 6,073,770 A | 6/2000 | Park |
| 6,082,535 A | 7/2000 | Mitchell |
| 6,092,707 A | 7/2000 | Bowes |
| 6,094,785 A | 8/2000 | Montgomery et al. |
| 6,128,441 A | 10/2000 | Kamata et al. |
| 6,132,367 A | 10/2000 | Adair |
| 6,201,867 B1 | 3/2001 | Koike |
| 6,215,474 B1 | 4/2001 | Shah |
| 6,239,968 B1 | 5/2001 | Kim et al. |
| 6,273,252 B1 | 8/2001 | Mitchell |
| 6,274,826 B1 | 8/2001 | Serizawa et al. |
| 6,301,100 B1 | 10/2001 | Iwata |
| 6,304,459 B1 | 10/2001 | Toyosato et al. |
| 6,305,656 B1 | 10/2001 | Wemyss |
| 6,311,017 B1 | 10/2001 | Mori |
| 6,313,892 B2 | 11/2001 | Gleckman |
| 6,313,982 B1 | 11/2001 | Hino |
| 6,317,313 B1 | 11/2001 | Mosgrove et al. |
| 6,349,824 B1 | 2/2002 | Yamada |
| 6,353,529 B1 | 3/2002 | Cies |
| 6,375,009 B1 | 4/2002 | Lee |
| 6,388,877 B1 | 5/2002 | Canova et al. |
| 6,396,769 B1 | 5/2002 | Polany |
| 6,398,585 B1 | 6/2002 | Fukuda |
| 6,415,138 B2 | 7/2002 | Sirola et al. |
| 6,445,577 B1 | 9/2002 | Madsen et al. |
| 6,456,487 B1 | 9/2002 | Hetterick |
| 6,464,522 B2 | 10/2002 | Osawa et al. |
| 6,471,056 B1 | 10/2002 | Tzeng |
| 6,519,141 B2 | 2/2003 | Tseng et al. |
| 6,525,928 B1 | 2/2003 | Madsen et al. |
| 6,532,152 B1 | 3/2003 | White et al. |
| 6,536,589 B2 | 3/2003 | Chang |
| 6,571,056 B2 | 5/2003 | Shimamura et al. |
| 6,574,434 B2 | 6/2003 | Matsuoto et al. |
| 6,594,472 B1 | 7/2003 | Curtis et al. |
| 6,595,608 B1 | 7/2003 | Minelli et al. |
| 6,597,865 B1 | 7/2003 | Negishi et al. |
| 6,614,423 B1 | 9/2003 | Wong et al. |
| 6,614,722 B2 | 9/2003 | Polany et al. |
| 6,616,111 B1 | 9/2003 | White |
| 6,617,973 B1 | 9/2003 | Osterman |
| 6,625,394 B2 | 9/2003 | Smith et al. |
| 6,626,362 B1 | 9/2003 | Steiner et al. |

(56) References Cited

U.S. PATENT DOCUMENTS

| | | | |
|---|---|---|---|
| 6,634,494 B1 | 10/2003 | Derr et al. | |
| 6,636,697 B2 | 10/2003 | Smith et al. | |
| 6,646,864 B2 | 11/2003 | Richardson | |
| 6,659,274 B2 | 12/2003 | Enners | |
| 6,665,174 B1 | 12/2003 | Derr et al. | |
| 6,667,738 B2 | 12/2003 | Murphy | |
| 6,669,017 B2 | 12/2003 | Linihan | |
| 6,698,608 B2 | 3/2004 | Parker et al. | |
| 6,701,159 B1 | 3/2004 | Powell | |
| 6,721,651 B1 | 4/2004 | Minelli | |
| 6,731,913 B2 | 5/2004 | Humphreys et al. | |
| 6,739,759 B1 | 5/2004 | Seeley | |
| 6,751,552 B1 | 6/2004 | Minelli | |
| 6,760,570 B1 | 7/2004 | Higdon | |
| 6,772,899 B2 | 8/2004 | Delmon | |
| 6,778,388 B1 | 8/2004 | Minelli | |
| 6,781,825 B2 | 8/2004 | Shih et al. | |
| 6,785,566 B1 | 8/2004 | Irizarry | |
| 6,819,549 B1 | 11/2004 | Lammers-Meis et al. | |
| 6,819,866 B2 | 11/2004 | Silva | |
| 6,822,161 B2 | 11/2004 | Komatsu et al. | |
| 6,822,640 B2 | 11/2004 | Derocher | |
| 6,839,430 B2 | 1/2005 | Kwak | |
| 6,844,845 B1 | 1/2005 | Whiteside et al. | |
| 6,848,930 B2 | 2/2005 | Fukuda | |
| 6,913,201 B1 | 7/2005 | Wagner et al. | |
| 6,914,774 B1 | 7/2005 | Albertini et al. | |
| 6,929,141 B1 | 8/2005 | Minghetti | |
| 6,953,126 B2 | 10/2005 | Parker et al. | |
| 6,954,405 B2 | 10/2005 | Polany et al. | |
| 6,955,293 B1 | 10/2005 | Katsanevas | |
| 6,962,454 B1 | 11/2005 | Costello | |
| 6,971,517 B2 | 12/2005 | Chen | |
| 6,975,888 B2 | 12/2005 | Buesseler et al. | |
| 6,980,777 B2 | 12/2005 | Shepherd et al. | |
| 6,983,130 B2 | 1/2006 | Chien et al. | |
| 6,987,527 B2 | 1/2006 | Kossin | |
| 6,992,659 B2 | 1/2006 | Gettemy | |
| 6,995,976 B2 | 2/2006 | Richardson | |
| 7,025,274 B2 | 4/2006 | Solomon et al. | |
| 7,033,215 B2 | 4/2006 | Kobayashi | |
| 7,046,230 B2 | 5/2006 | Zadesky et al. | |
| 7,048,561 B1 | 5/2006 | Elbaz | |
| 7,050,712 B2 | 5/2006 | Shimamura | |
| 7,050,841 B1 | 5/2006 | Onda | |
| 7,054,441 B2 | 5/2006 | Pletikosa | |
| 7,061,762 B2 | 6/2006 | Canova et al. | |
| 7,069,063 B2 | 6/2006 | Halkosaari et al. | |
| 7,072,467 B2 | 7/2006 | Ono | |
| 7,074,066 B2 * | 7/2006 | Pepe | G02B 6/3807 439/271 |
| 7,082,264 B2 | 7/2006 | Watanabe et al. | |
| 7,085,542 B2 | 8/2006 | Dietrich et al. | |
| 7,089,547 B2 | 8/2006 | Goodman et al. | |
| 7,106,959 B2 | 9/2006 | Sato | |
| 7,146,701 B2 | 12/2006 | Mahoney et al. | |
| 7,158,376 B2 | 1/2007 | Richardson et al. | |
| 7,180,735 B2 | 2/2007 | Thomas et al. | |
| 7,194,086 B2 | 3/2007 | Pletikosa | |
| 7,194,202 B2 | 3/2007 | Funahashi et al. | |
| 7,194,291 B2 | 3/2007 | Peng | |
| 7,225,923 B2 | 6/2007 | Hallee et al. | |
| 7,230,823 B2 | 6/2007 | Richardson et al. | |
| 7,236,588 B2 | 6/2007 | Gartrell | |
| 7,255,228 B2 | 8/2007 | Kim | |
| 7,263,032 B2 | 8/2007 | Polany et al. | |
| 7,290,654 B2 | 11/2007 | Hodges | |
| 7,303,418 B2 | 12/2007 | O'Connor | |
| 7,312,984 B2 | 12/2007 | Richardson et al. | |
| 7,327,841 B2 | 2/2008 | Schreiber et al. | |
| 7,341,144 B2 | 3/2008 | Tajiri et al. | |
| 7,343,184 B2 | 3/2008 | Rostami | |
| 7,352,961 B2 | 4/2008 | Watanabe et al. | |
| 7,362,570 B2 | 4/2008 | Su | |
| 7,365,281 B2 | 4/2008 | Yamaguchi et al. | |
| 7,366,555 B2 | 4/2008 | Jokinen et al. | |
| 7,369,881 B2 | 5/2008 | Tsujimoto | |
| 7,389,869 B2 | 6/2008 | Mason | |
| 7,400,917 B2 | 7/2008 | Wood et al. | |
| 7,409,148 B2 | 8/2008 | Takahashi et al. | |
| 7,418,278 B2 | 8/2008 | Eriksson et al. | |
| 7,428,427 B2 | 9/2008 | Brunstrom et al. | |
| 7,436,653 B2 | 10/2008 | Yang et al. | |
| 7,448,908 B2 | 11/2008 | Iwahori et al. | |
| 7,449,650 B2 | 11/2008 | Richardson et al. | |
| 7,464,813 B2 | 12/2008 | Carnevali | |
| 7,464,814 B2 | 12/2008 | Carnevali | |
| 7,495,659 B2 | 2/2009 | Marriott et al. | |
| 7,495,895 B2 | 2/2009 | Carnevali | |
| 7,499,040 B2 | 3/2009 | Zadesky et al. | |
| 7,502,550 B2 | 3/2009 | Ariga | |
| 7,511,956 B2 | 3/2009 | Tomioka et al. | |
| 7,525,792 B2 | 4/2009 | Yokote | |
| 7,535,799 B2 | 5/2009 | Polany et al. | |
| 7,540,844 B2 | 6/2009 | Muser | |
| 7,555,325 B2 | 6/2009 | Goros | |
| 7,558,594 B2 | 7/2009 | Wilson | |
| 7,594,576 B2 | 9/2009 | Chen et al. | |
| 7,609,512 B2 | 10/2009 | Richardson et al. | |
| 7,613,386 B2 | 11/2009 | Shimamura | |
| 7,623,898 B2 | 11/2009 | Holmberg | |
| 7,630,746 B2 | 12/2009 | Holmberg | |
| 7,653,292 B2 | 1/2010 | Yamaguchi et al. | |
| 7,663,878 B2 | 2/2010 | Swan et al. | |
| 7,663,879 B2 | 2/2010 | Richardson et al. | |
| 7,668,580 B2 | 2/2010 | Shin et al. | |
| 7,679,674 B2 | 3/2010 | Nishizawa | |
| 7,688,580 B2 | 3/2010 | Richardson et al. | |
| 7,697,269 B2 | 4/2010 | Yang et al. | |
| 7,711,400 B2 | 5/2010 | Nuovo | |
| 7,733,642 B2 | 6/2010 | Liou et al. | |
| 7,755,975 B2 | 7/2010 | Pettersen et al. | |
| 7,772,507 B2 | 8/2010 | Orr et al. | |
| 7,775,354 B2 | 8/2010 | Latchford et al. | |
| 7,787,756 B2 | 8/2010 | Funahashi et al. | |
| 7,789,228 B2 | 9/2010 | Zenzai | |
| 7,789,696 B2 | 9/2010 | Umei et al. | |
| 7,801,425 B2 | 9/2010 | Fantone et al. | |
| 7,854,434 B2 | 12/2010 | Heiman et al. | |
| 7,889,489 B2 | 2/2011 | Richardson et al. | |
| 7,907,394 B2 | 3/2011 | Richardson et al. | |
| 7,926,818 B2 | 4/2011 | Isono | |
| 7,933,122 B2 | 4/2011 | Richardson et al. | |
| 7,936,566 B2 | 5/2011 | Shigyo et al. | |
| 7,941,196 B2 | 5/2011 | Kawasaki et al. | |
| 7,944,697 B2 | 5/2011 | Hata et al. | |
| 7,975,870 B2 | 7/2011 | Laule et al. | |
| 7,978,092 B2 | 7/2011 | Osaka | |
| 7,988,468 B2 | 8/2011 | Yang et al. | |
| 7,988,476 B2 * | 8/2011 | Billman | H01R 13/622 439/271 |
| 8,014,134 B2 | 9/2011 | Liu et al. | |
| 8,024,015 B2 | 9/2011 | Araki et al. | |
| 8,031,472 B2 | 10/2011 | Bicket et al. | |
| 8,032,194 B2 | 10/2011 | Liu et al. | |
| 8,050,022 B2 | 11/2011 | McIntyre | |
| 8,053,668 B2 | 11/2011 | Lai et al. | |
| 8,068,331 B2 | 11/2011 | Sauers et al. | |
| 8,089,757 B2 | 1/2012 | Chen et al. | |
| 8,101,859 B2 | 1/2012 | Zadesky | |
| 8,138,434 B2 | 3/2012 | Tang et al. | |
| 8,164,899 B2 | 4/2012 | Yamaguchi et al. | |
| 8,167,126 B2 | 5/2012 | Stiehl | |
| 8,191,706 B1 | 6/2012 | Liu | |
| 8,204,561 B2 | 6/2012 | Mongan et al. | |
| 8,210,859 B2 | 7/2012 | Tiberghien et al. | |
| 8,223,997 B2 | 7/2012 | Wilson, II et al. | |
| 8,251,210 B2 | 8/2012 | Schmidt et al. | |
| 8,265,264 B2 | 9/2012 | Yamaguchi et al. | |
| 8,269,104 B2 | 9/2012 | Choraku et al. | |
| 8,286,789 B2 | 10/2012 | Wilson et al. | |
| 8,311,595 B2 | 11/2012 | Takatsuka et al. | |
| 8,342,325 B2 | 1/2013 | Rayner | |
| 8,373,980 B2 | 2/2013 | Reber | |

(56) References Cited

U.S. PATENT DOCUMENTS

| | | |
|---|---|---|
| 8,393,466 B2 | 3/2013 | Rayner |
| 8,400,408 B2 | 3/2013 | Hotelling et al. |
| 8,430,240 B2 | 4/2013 | Kim |
| 8,454,101 B2 | 6/2013 | Kuo |
| 8,531,824 B2 | 9/2013 | Rayner |
| 8,531,834 B2 | 9/2013 | Rayner |
| 8,548,541 B2 | 10/2013 | Rayner |
| 8,564,950 B2 | 10/2013 | Rayner |
| 8,570,737 B2 | 10/2013 | Rayner |
| 8,611,969 B2 | 12/2013 | Smith et al. |
| 8,708,142 B2 | 4/2014 | Rayner |
| 2001/0040109 A1 | 11/2001 | Yaski et al. |
| 2002/0003584 A1 | 1/2002 | Kossin |
| 2002/0009195 A1 | 1/2002 | Schon |
| 2002/0065054 A1 | 5/2002 | Humphreys et al. |
| 2002/0071550 A1 | 6/2002 | Pletikosa |
| 2002/0079244 A1 | 6/2002 | Kwong |
| 2002/0085342 A1 | 7/2002 | Chen et al. |
| 2002/0085709 A1 | 7/2002 | Hsu |
| 2002/0086702 A1 | 7/2002 | Lai et al. |
| 2002/0090212 A1 | 7/2002 | Shimamura et al. |
| 2002/0101707 A1 | 8/2002 | Canova et al. |
| 2002/0122353 A1 | 9/2002 | Polany et al. |
| 2002/0136557 A1 | 9/2002 | Shimamura |
| 2002/0137475 A1 | 9/2002 | Shou et al. |
| 2002/0175096 A1 | 11/2002 | Linihan |
| 2002/0175901 A1 | 11/2002 | Gettemy |
| 2002/0193136 A1 | 12/2002 | Halkosaari et al. |
| 2002/0195910 A1 | 12/2002 | Hus et al. |
| 2003/0080947 A1 | 5/2003 | Genest et al. |
| 2003/0095374 A1 | 5/2003 | Richardson |
| 2003/0103624 A1 | 6/2003 | Hu |
| 2003/0111366 A1 | 6/2003 | Enners |
| 2003/0118332 A1 | 6/2003 | Smith et al. |
| 2003/0118334 A1 | 6/2003 | Smith et al. |
| 2003/0128397 A1 | 7/2003 | Smith et al. |
| 2003/0151890 A1 | 8/2003 | Huang et al. |
| 2003/0223577 A1 | 12/2003 | Ono |
| 2004/0014506 A1 | 1/2004 | Kemppinen |
| 2004/0076415 A1 | 4/2004 | Silva |
| 2004/0089570 A1 | 5/2004 | Chien et al. |
| 2004/0120219 A1 | 6/2004 | Polany et al. |
| 2004/0121226 A1 | 6/2004 | Kaelin et al. |
| 2004/0188120 A1 | 9/2004 | Komatsu et al. |
| 2004/0195783 A1 | 10/2004 | Akagi et al. |
| 2004/0203502 A1 | 10/2004 | Dietrich et al. |
| 2004/0226836 A1 | 11/2004 | Schreiber et al. |
| 2005/0052425 A1 | 3/2005 | Zadesky et al. |
| 2005/0110768 A1 | 5/2005 | Marriott et al. |
| 2005/0115852 A1 | 6/2005 | Funahashi et al. |
| 2005/0123161 A1 | 6/2005 | Polany et al. |
| 2005/0139498 A1 | 6/2005 | Goros |
| 2005/0167304 A1 | 8/2005 | Shimamura |
| 2005/0174727 A1 | 8/2005 | Thomas et al. |
| 2005/0181843 A1 | 8/2005 | Tsujimoto |
| 2005/0224508 A1 | 10/2005 | Tajiri et al. |
| 2005/0247584 A1 | 11/2005 | Lu |
| 2005/0279661 A1 | 12/2005 | Hodges |
| 2006/0008261 A1 | 1/2006 | Watanabe et al. |
| 2006/0110146 A1 | 5/2006 | Ariga |
| 2006/0255493 A1 | 11/2006 | Fouladpour |
| 2006/0274493 A1 | 12/2006 | Richardson et al. |
| 2006/0279924 A1 | 12/2006 | Richardson et al. |
| 2007/0040931 A1 | 2/2007 | Nishizawa |
| 2007/0071423 A1 | 3/2007 | Fantone et al. |
| 2007/0074473 A1 | 4/2007 | Yamaguchi et al. |
| 2007/0086273 A1 | 4/2007 | Polany et al. |
| 2007/0109730 A1 | 5/2007 | Shigyo et al. |
| 2007/0110416 A1 | 5/2007 | Yamaguchi et al. |
| 2007/0115387 A1 | 5/2007 | Ho |
| 2007/0138920 A1 | 6/2007 | Austin et al. |
| 2007/0139873 A1 | 6/2007 | Thomas et al. |
| 2007/0146985 A1 | 6/2007 | Mick et al. |
| 2007/0158220 A1 | 7/2007 | Cleereman et al. |
| 2007/0215663 A1 | 9/2007 | Chongson et al. |
| 2007/0241012 A1 | 10/2007 | Latchford et al. |
| 2007/0261976 A1 | 11/2007 | Anderson |
| 2007/0261978 A1 | 11/2007 | Sanderson |
| 2007/0280053 A1 | 12/2007 | Polany et al. |
| 2007/0297149 A1 | 12/2007 | Richardson et al. |
| 2008/0039161 A1 | 2/2008 | Chan |
| 2008/0055258 A1 | 3/2008 | Sauers |
| 2008/0081679 A1 | 4/2008 | Kawasaki et al. |
| 2008/0157485 A1 | 7/2008 | Isono |
| 2008/0163463 A1 | 7/2008 | Hulden |
| 2008/0164267 A1 | 7/2008 | Huber |
| 2008/0171456 A1 | 7/2008 | Vanzo |
| 2008/0316687 A1 | 12/2008 | Richardson et al. |
| 2009/0009945 A1 | 1/2009 | Johnson et al. |
| 2009/0017884 A1 | 1/2009 | Rotschild |
| 2009/0028535 A1 | 1/2009 | Funahashi et al. |
| 2009/0032420 A1 | 2/2009 | Zenzai |
| 2009/0034169 A1 | 2/2009 | Richardson et al. |
| 2009/0080153 A1 | 3/2009 | Richardson et al. |
| 2009/0087655 A1 | 4/2009 | Yamada et al. |
| 2009/0090532 A1 | 4/2009 | Lai et al. |
| 2009/0109635 A1 | 4/2009 | Chen et al. |
| 2009/0111543 A1 | 4/2009 | Tai et al. |
| 2009/0113758 A1 | 5/2009 | Nishiwaki et al. |
| 2009/0117957 A1 | 5/2009 | Araki et al. |
| 2009/0167545 A1 | 7/2009 | Osaka |
| 2009/0211775 A1 | 8/2009 | Yamaguchi et al. |
| 2009/0215412 A1 | 8/2009 | Liu et al. |
| 2009/0260844 A1 | 10/2009 | Tseng |
| 2009/0283184 A1 | 11/2009 | Han |
| 2010/0044198 A1 | 2/2010 | Tang et al. |
| 2010/0053355 A1 | 3/2010 | Iwase et al. |
| 2010/0085691 A1 | 4/2010 | Yeh et al. |
| 2010/0093412 A1 | 4/2010 | Serra et al. |
| 2010/0096284 A1 | 4/2010 | Bau |
| 2010/0104814 A1 | 4/2010 | Richardson et al. |
| 2010/0144194 A1 | 6/2010 | Umei et al. |
| 2010/0147737 A1 | 6/2010 | Richardson et al. |
| 2010/0181108 A1 | 7/2010 | Hata et al. |
| 2010/0203931 A1 | 8/2010 | Hynecek et al. |
| 2010/0206601 A1 | 8/2010 | Choraku et al. |
| 2010/0238119 A1 | 9/2010 | Dubrovsky et al. |
| 2010/0313485 A1 | 12/2010 | Kuo |
| 2011/0017620 A1 | 1/2011 | Latchford et al. |
| 2011/0024315 A1 | 2/2011 | Kim |
| 2011/0073608 A1 | 3/2011 | Richardson et al. |
| 2011/0157055 A1 | 6/2011 | Tilley et al. |
| 2011/0157800 A1 | 6/2011 | Richardson et al. |
| 2011/0228460 A1 | 9/2011 | Kim et al. |
| 2011/0300730 A1 | 12/2011 | Someya |
| 2011/0300731 A1 | 12/2011 | Nakamura |
| 2012/0031914 A1 | 2/2012 | Liu |
| 2012/0043235 A1 | 2/2012 | Klement |
| 2012/0099261 A1 | 4/2012 | Reber |
| 2012/0099262 A1 | 4/2012 | Reber et al. |
| 2012/0099265 A1 | 4/2012 | Reber |
| 2012/0099266 A1 | 4/2012 | Reber et al. |
| 2012/0100737 A1 | 4/2012 | Frey |
| 2012/0103844 A1 | 5/2012 | Piedra et al. |
| 2012/0118773 A1 | 5/2012 | Rayner |
| 2012/0168336 A1 | 7/2012 | Schmidt et al. |
| 2012/0196464 A1 | 8/2012 | Lu |
| 2012/0211382 A1 | 8/2012 | Rayner |
| 2012/0314354 A1 | 12/2012 | Rayner |
| 2013/0027862 A1 | 1/2013 | Rayner |
| 2013/0043777 A1 | 2/2013 | Rayner |
| 2013/0077226 A1 | 3/2013 | Rayner |
| 2013/0084728 A1 | 4/2013 | Omae et al. |
| 2013/0088130 A1 | 4/2013 | Rayner |
| 2013/0092576 A1 | 4/2013 | Rayner |
| 2013/0182881 A1 | 7/2013 | Horino et al. |
| 2013/0203277 A1* | 8/2013 | Gaubert ............ H01R 13/5219 439/271 |
| 2013/0220841 A1 | 8/2013 | Yang |
| 2013/0224993 A1 | 8/2013 | Purdy |
| 2013/0334072 A1 | 12/2013 | Rayner |
| 2014/0038443 A1 | 2/2014 | Campbell et al. |

(56) References Cited

U.S. PATENT DOCUMENTS

| | | |
|---|---|---|
| 2014/0213088 A1 | 7/2014 | Furuya et al. |
| 2014/0248787 A1 | 9/2014 | Suzuki et al. |

FOREIGN PATENT DOCUMENTS

| | | |
|---|---|---|
| JP | H0561069 U | 8/1993 |
| JP | H0818637 A | 6/1994 |
| JP | 3060175 U | 7/1999 |
| JP | 2000125916 A | 5/2000 |
| JP | 2000341383 A | 12/2000 |
| JP | 2002280757 A | 9/2002 |
| JP | 2003164316 A | 6/2003 |
| WO | 1994000037 A1 | 1/1994 |
| WO | 1999041958 A1 | 8/1999 |
| WO | 2000051315 A1 | 8/2000 |
| WO | 2002011161 A2 | 2/2002 |
| WO | 2007122722 A1 | 11/2007 |
| WO | 2012074151 A1 | 6/2012 |
| WO | 2012051358 | 12/2012 |
| WO | 2012174175 A2 | 12/2012 |
| WO | 2013096927 A1 | 6/2013 |

\* cited by examiner

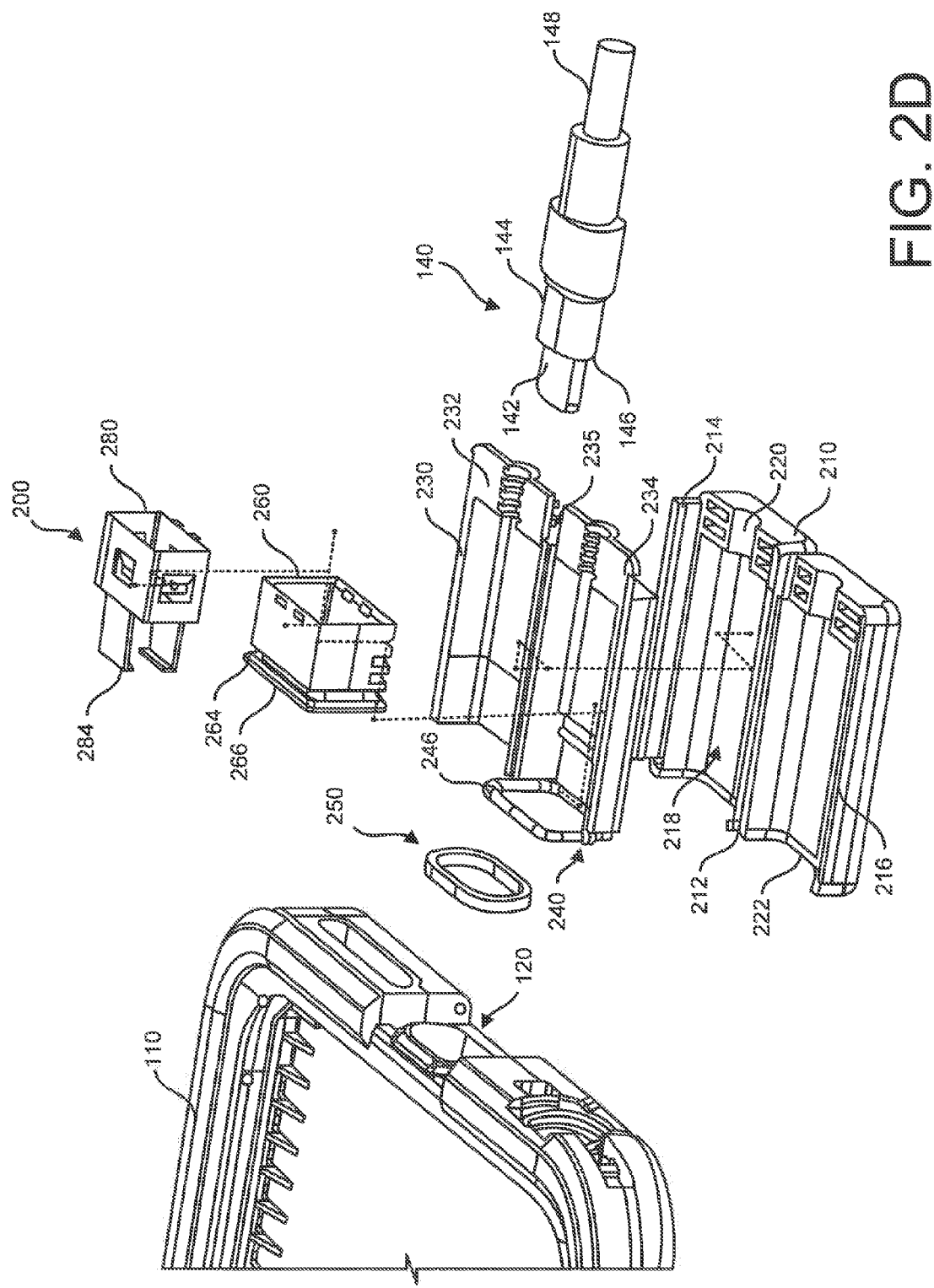

CONNECTOR FOR FLUIDLY SEALING AN
APERTURE OF A PROTECTIVE CASE

This disclosure relates generally to cases, covers, shells, and enclosures for electronic devices.

BACKGROUND

Portable electronic devices are commonly used for communication, data processing, entertainment, and/or information gathering purposes, and are commonly used in a variety of environments. Portable electronic devices include devices such as smartphones, cellular phones, mobile communication devices, computers, portable computing devices, mobile computing devices, tablet computers, cameras, video players, audio players, electronic media readers, two-way radios, satellite-based navigation devices (e.g. global positioning system receiving device), and/or other types of electronic computing or communication devices, including combinations thereof. Such devices can have ports or female connectors that allow a wired connection that permits data and/or power transmission between the device and another device or accessory, such as a battery, a headphone and/or a microphone.

It is desirable to use such portable electronic devices in environments that pose potential risk of damage to the device from environmental contaminants such as dirt, dust, water, liquid, etc. In such instances, use of a water-resistant or waterproof case for the portable electronic device is desirable to protect the portable electronic device from the possible environmental contaminants is desirable. Such waterproof or water-resistant case may include a port that can be opened to provide access to a connector of the encased portable electronic device; the port can then be closed to provide a waterproof or water-resistant seal at the port.

However, in certain instances it is desirable to maintain a removable wired connection to the portable electronic device inside a case, while still maintaining the water-resistant or waterproof integrity of the case. For example, while exercising or walking outdoors a user may use a smartphone to listen to music through a set of wired headphones, or a user may charge the smartphone using a separate battery pack via a wired connection.

The case that protects the portable electronic device has a thickness that creates additional distance which must be crossed by a removable wired connector (e.g. a male headphone plug and/or male power plug). Using a standard connector with such a case can be accommodated by an aperture that allows the backshell of the connector to cross at least part of the case thickness. However, once the removable wired connector is inserted, a leak path is introduced between the wired connector and the corresponding device connector.

In some instances, a water-resistant or waterproof connection between the case, the removable wired connector, and the device connector can be made using an intermediary adaptor with a longer-than-normal male portion and having a body that can be secured to the case (e.g. by threads or a bayonet-style connection). Such an adaptor may include a seal that interfaces with a portion of the case once the adaptor is secured to the case. However, such intermediary adaptors may be easily misplaced by users.

This disclosure is directed to cases, shells, and housings that permit a user to form a removable water-resistant or waterproof seal between a connector and a water-resistant or waterproof case, while still allowing the connector to connect with the portable electronic device and transmit data and/or power between the encased portable electronic device and the connector.

SUMMARY

In one aspect, cases, shells, and housings for a portable electronic device are disclosed, the portable electronic device having a device connector for transmission of data and/or power between the device connector and a data and/or power source via a reciprocal connector assembly. Cases, shells, and housings described herein include an aperture disposed proximate the device connector of the installed portable electronic device. The aperture passes between an outer surface and an inner surface of the case and is defined by a surface between the outer and inner surfaces. The aperture also has a circumference. A compliant seal is disposed on the surface of the aperture and around the circumference of the aperture. The compliant seal interfaces with at least a portion of a backshell of the reciprocal connector assembly when the reciprocal connector assembly is inserted through the aperture to interface with the device connector of the installed portable electronic device.

In another aspect, cases, shells, and housings for a portable electronic device are disclosed, with the portable electronic device having a device connector for transmission of data and/or power between the device connector and a data and/or power source via a reciprocal connector assembly. In such an aspect, an aperture is disposed proximate the device connector of the installed portable electronic device, with the aperture passing between an outer surface and an inner surface of the case. The aperture has a circumference. A compliant seal is disposed on the outer surface of the case and surrounding the circumference of the aperture. The compliant seal interfaces with a face portion of a backshell portion of the reciprocal connector assembly when the reciprocal connector assembly is inserted through the aperture to interface with the device connector of the installed portable electronic device.

In another aspect, a connector for connecting a reciprocal connector to a device connector of a portable electronic device accessed through an aperture of a protective case is provided. The connector includes a sleeve for receiving at least a portion of the reciprocal connector; an orientation member including a hollow body member configured to receive at least a portion of the reciprocal connector, the orientation member including one or more depth arms configured to contact a face portion of the reciprocal connector and resist movement of the reciprocal connector in a first direction; and a seal positioned between the sleeve and the device connector, the seal fluidly sealing the aperture of the protective case.

In another aspect, a connector for positioning a reciprocal connector in a predetermined position is provided. The connector includes a hollow body member having an interior configured to receive at least a portion of the reciprocal connector within the interior; one or more depth arms extending from the hollow body member, the depth arms configured to contact a face portion of the reciprocal connector and resist movement of the reciprocal connector in a first direction; a first pair of aligning tabs configured to contact a first portion of the reciprocal connector when the reciprocal connector is received in the interior, the first pair of aligning tabs further configured to center and hold the first portion of the reciprocal connector along a first axis within the interior of the hollow body member; and a second pair of aligning tabs configured to contact a second portion of the reciprocal connector when the reciprocal connector is received in the interior, the second pair of aligning tabs further configured to center and hold the second portion of the reciprocal connector along a second axis within the interior of the hollow body member.

The summary of the invention described above is non-limiting and other features and advantages of the invention will be apparent from the following detailed description of the invention, and from the claims.

BRIEF DESCRIPTION OF THE FIGURES

FIG. 2D shows an exploded view of the connector of FIG. 2A, an electronic device, and a reciprocal connector.

DETAILED DESCRIPTION OF THE DISCLOSURE

The present disclosure is directed to cases, covers, shells, and enclosures for electronic devices. The cases, covers, shells, and enclosures have an aperture or port that allows connector access to a data and/or power connector (e.g. male or female) on the housing of the electronic device itself. An aperture seal formed from a compliant material is disposed on a surface of the aperture or port. A data and/or power connector for an accessory (e.g. headphones and/or battery) that is inserted through the aperture of the case forms a water-resistant or waterproof seal with the aperture seal, eliminating the need for a separate intermediary adaptor that secures to and seals with the case.

Figure 1A:
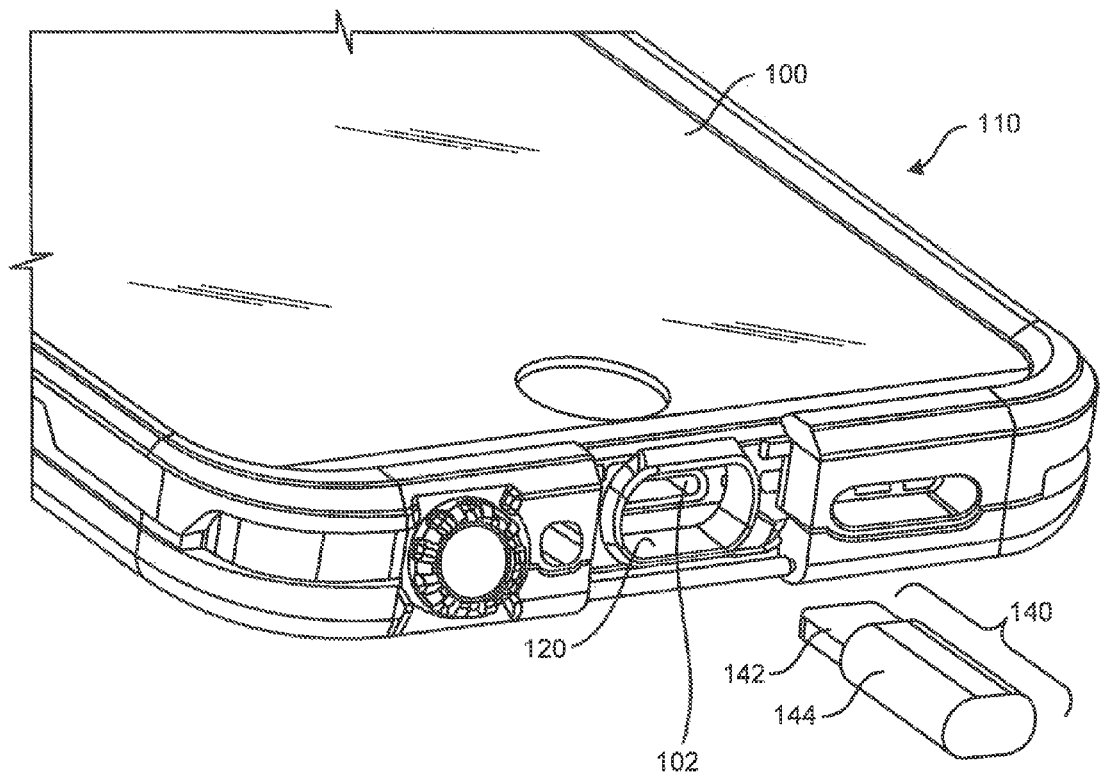
FIG. 1A shows a perspective view of a protective case encasing a portable electronic device, and a connector for connecting with the portable electronic device.

FIG. 1A shows a perspective view of a case 110 encasing a portable electronic device 100. Aperture 120 of case 110 is positioned proximate device connector 102 of portable electronic device 100. Case 110 is waterproof or water-resistant when a door or cover (not shown) covers aperture 120. Such waterproof and water-resistant doors and covers may include those described in U.S. Pat. Pub. No. 2012/0211382, incorporated herein by reference. Reciprocal connector assembly 140 is also shown, positioned to be inserted through aperture 120 such that reciprocal connector assembly 140 can interface with device connector 102.

Reciprocal connector assembly 140 allows for an electrical connection to device connector 102 of portable electronic device 100. In some exemplary embodiments, reciprocal connector assembly 140 provides an electronic path for interacting with portable electronic device 100. In some exemplary embodiments, reciprocal connector assembly 140 includes a cable 148 that terminates in another connector (e.g. a USB connector such as type-A or type-B), a wall adapter (e.g. for plugging into an outlet for charging), or terminates at an accessory device (e.g. a set of headphones or a battery); in other instances, backshell 144 may be connected to a rigid or semi-rigid accessory, without an intervening cable. In some exemplary embodiments, reciprocal connector assembly 140 terminates in an adapter (not shown) to which a cable or accessory may be removably connected.

Reciprocal connector assembly 140 includes backshell 144 and reciprocal connector 142 (depicted here as a male component). In other exemplary embodiments, reciprocal connector 142 may be a female component configured to receive a corresponding male component device connector 102 of portable electronic device 100. Reciprocal connector assembly illustratively includes a plurality of wires, electronic conductors, and electronical components. In some exemplary embodiments, reciprocal connector 142 is a connector carrying a digital signal, such as a 30 pin dock connector, an 8-pin connector, a USB type-A connector, a USB Micro-A type connector, a USB Mini-A type connector, a USB type-B connector, a USB Micro-B type connector, a USB Mini-B type connector, a USB type-C connector, or another suitable connector.

Figure 1B:
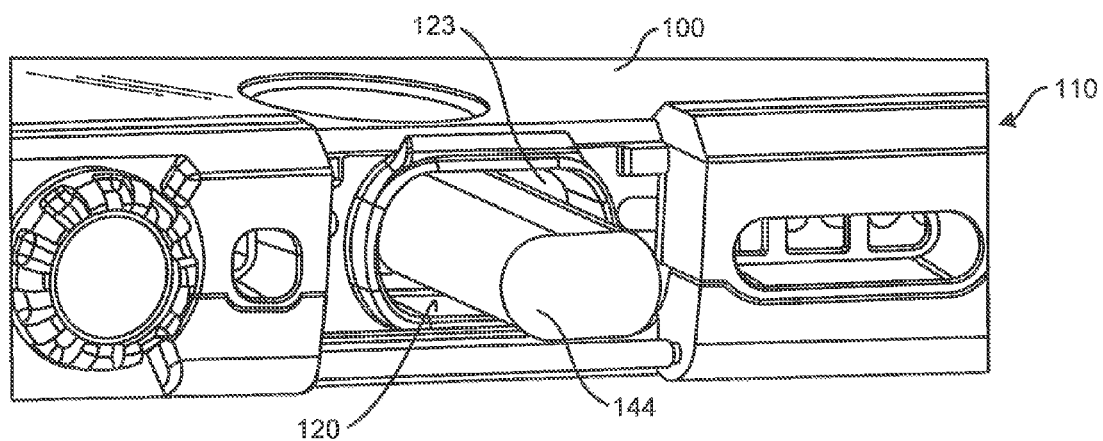
FIG. 1B shows a close-up perspective view of the case of FIG. 1A with a reciprocal connector assembly inserted through an aperture of the case.

FIG. 1B shows a close-up perspective view of case 110 with reciprocal connector assembly 140 inserted through aperture 120 and into device connector 102 (not visible in FIG. 1B) of portable electronic device 100. Aperture 120 has a circumference intentionally larger than that of backshell 144 in order to accommodate a variety of backshell sizes, as the backshell may not have highly constrained tolerance. Due to the larger circumference, a potential leak path or gap 123 is visible between backshell 144 and aperture 120. This gap allows liquid to leak from outside case 110, though aperture 120, into case 110, and between backshell 144 and device connector 102 (not visible in FIG. 1B). In order to block this leak path 123, an aperture seal may be added to aperture 120 that interfaces with a portion of backshell 144 to seal aperture 120 when reciprocal connector assembly 140 is inserted.

Figure 1C:
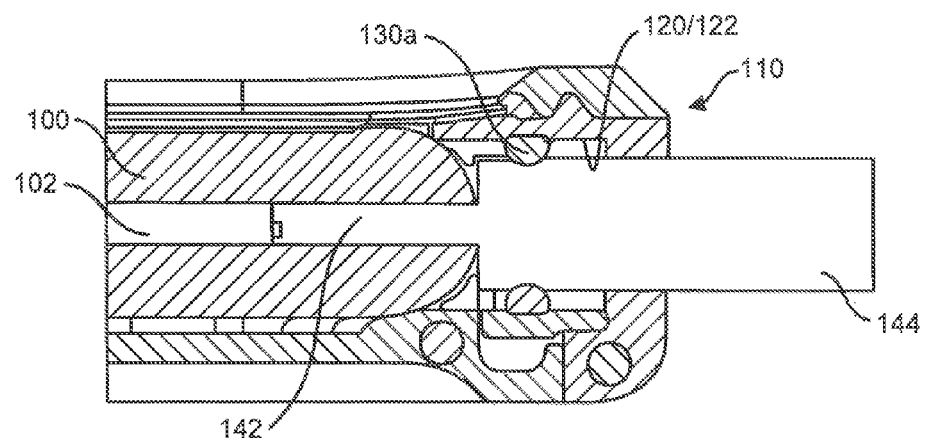
FIG. 1C shows a side sectional view of part of the case of FIG. 1A and including an aperture seal on the interior surface of the case aperture.

FIG. 1C illustrates a side sectional view of part of case 110 described above, also including an aperture seal 130a on interior surface 122 of aperture 120. Aperture seal 130a is configured as a gland seal, and is disposed around the circumference of aperture 120. Reciprocal connector assembly 140 is inserted through aperture 120, with reciprocal connector 142 inserted into device connector 102 and backshell 144 partially disposed in aperture 120 and interfacing with aperture seal 130a. The sealed interface between backshell 144 and interior surface 122 of case 110 fluidly seals aperture 120 around device connector 102, providing for a waterproof connection between device connector 102 of portable electronic device 100 and reciprocal connector 142 of reciprocal connector assembly 140.

Figure 1D:
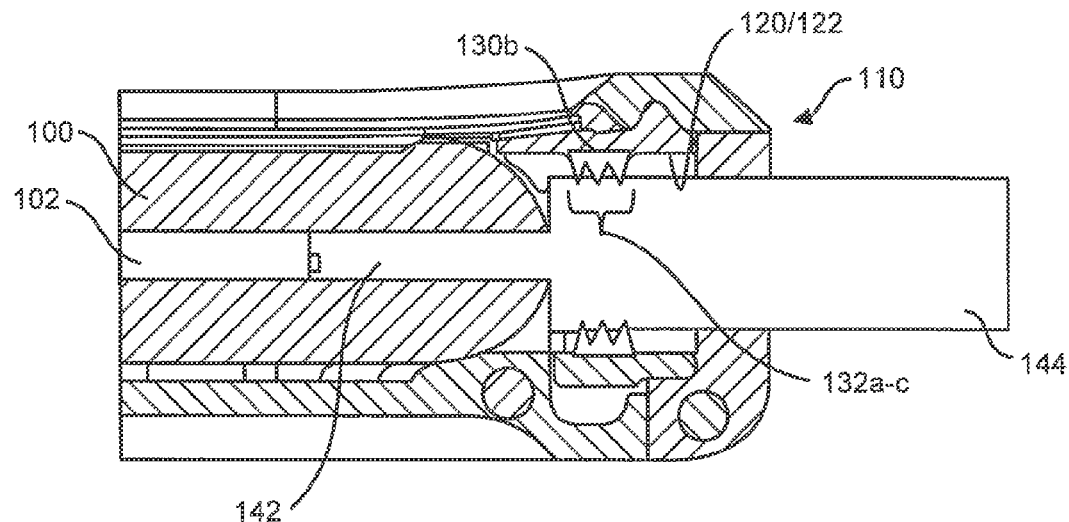
FIG. 1D shows a side sectional view of part of the case of FIG. 1A, also including a different type of aperture seal on the interior surface of the case aperture.

FIG. 1D shows a side sectional view of part of case 110 described above, including a different style of aperture seal 130b on interior surface 122 of aperture 120. Aperture seal 130b is configured with a plurality of ridges 132a-c that provide additional surface area for sealing with backshell 144.

Figure 1E:
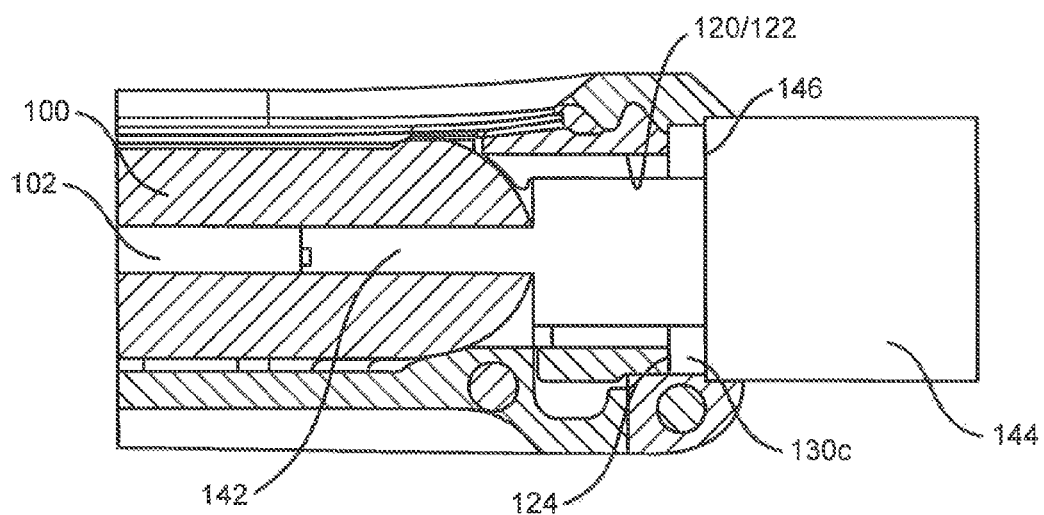
FIG. 1E shows a side sectional view of a portion of the case of FIG. 1A, utilizing a different type of aperture seal on a face portion of the case.

FIG. 1E illustrates a side sectional view of a portion of case 110, utilizing an aperture seal 130c that is configured as a face seal. Aperture seal 130c is disposed proximate the face portion 124 of aperture 120, and interfaces with a corresponding face portion 146 of backshell 144 to form a water-resistant or waterproof seal. In some embodiments, aperture seal 130c may interact with a removable door or cover having a sealing seat that interfaces with aperture seal 130c to seal aperture 120 when the removable door or cover is closed against aperture 120. The door or cover may include latching mechanisms or catches on both the door and the outer surface of the case that removably interact to maintain the seal between the sealing seat and the aperture seal 130c. The door or cover may be completely removable and separate from the case, or it may be attached by a tether, a hinge, or other attachment element. The door or cover may slide along a surface of the case along rails on the exterior of the case. Exemplary doors and covers are found in U.S. Pat. Pub. Nos. 2012/0211382, 2012/0314354, and 2015/0201723 each of which is incorporated herein by reference.

Other seal configurations may be utilized on the interior surface 122 or face portion 124 of aperture 120, including but not limited to: gland seals (male or female); boss seal; lip seal; stuffing box/gland; labyrinth seals; and connectors manufactured by MARSH & MARINE.

Figure 2A:
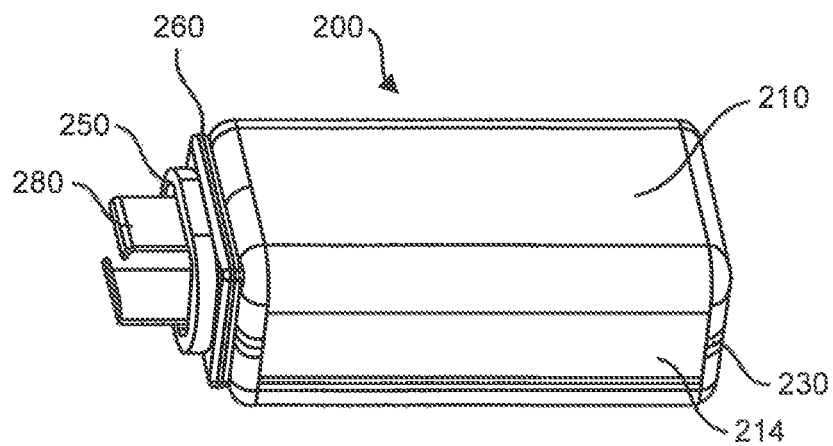
FIG. 2A shows a perspective view of a front of a connector for sealing a port of a portable electronic device.
Figure 2B:
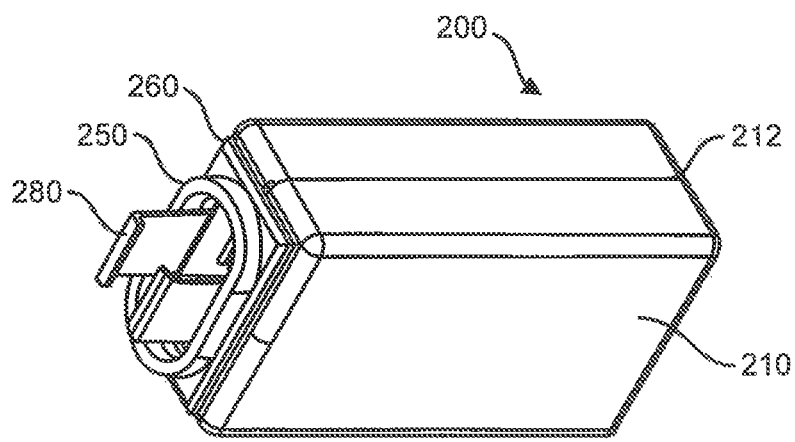
FIG. 2B shows a perspective view of the rear of the connector of FIG. 2A.
Figure 2C:
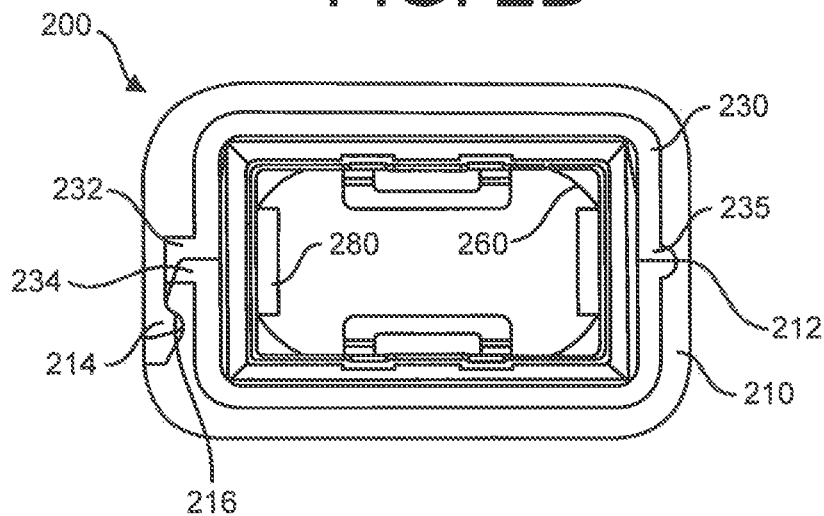
FIG. 2C shows a sectional view of the connector of FIG. 2A.
Figure 2E:
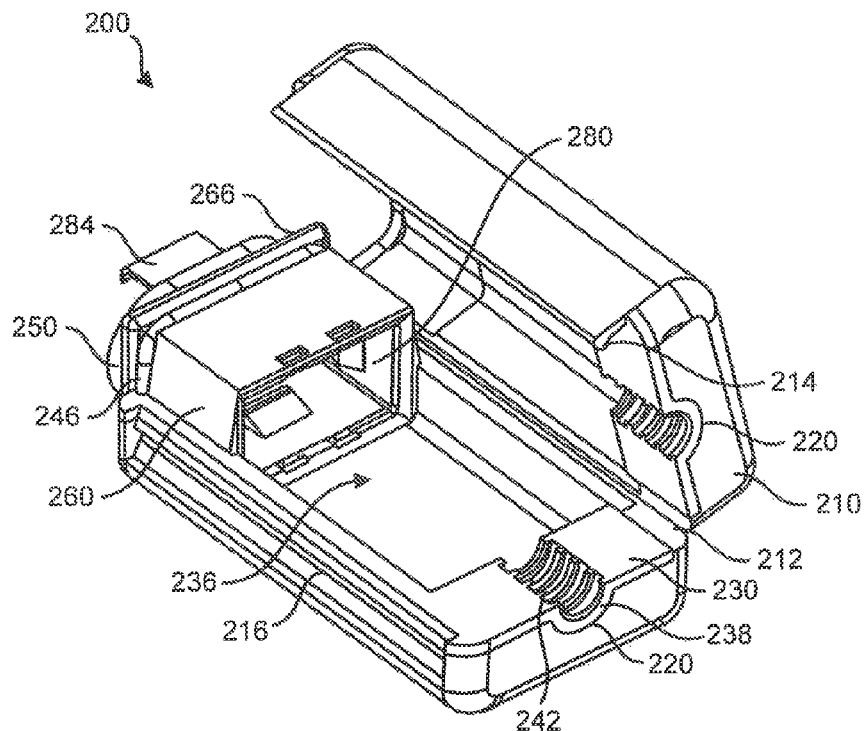
FIG. 2E shows the connector of FIG. 2A in an open configuration.
Figure 2F:
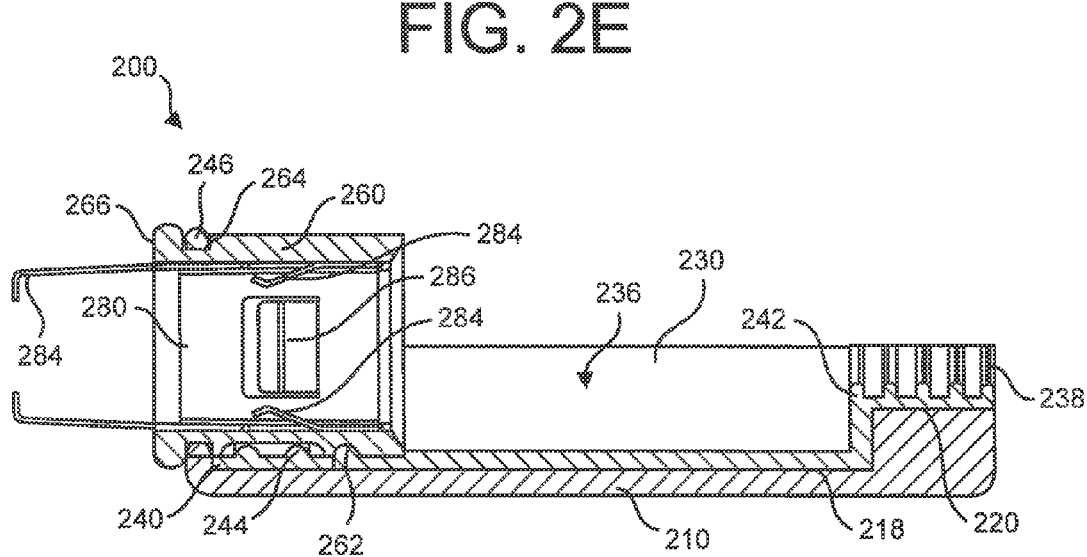
FIG. 2F shows a sectional view of the lower portion of the connector of FIG. 2E.
Figure 2G:
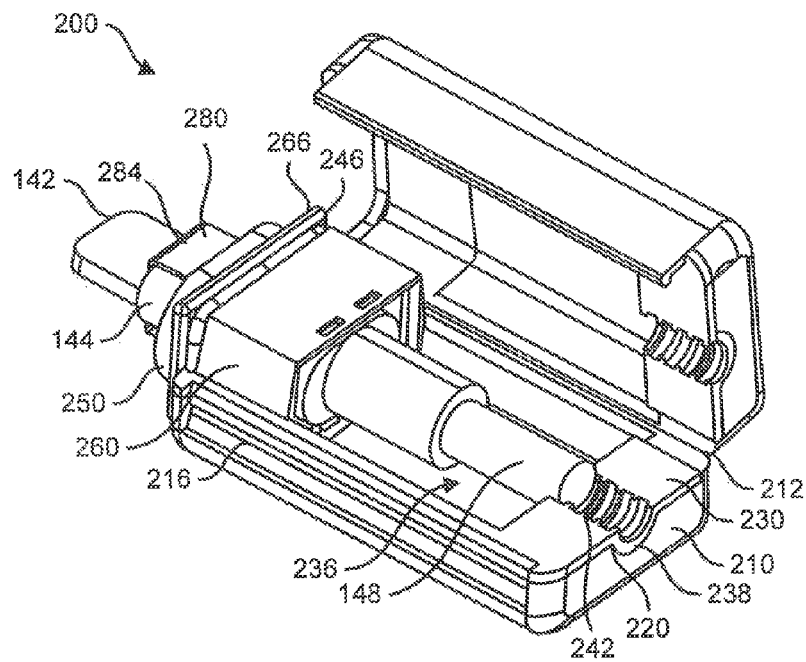
FIG. 2G shows the connector of FIG. 2A in the open configuration with the reciprocal connector installed.
Figure 2H:
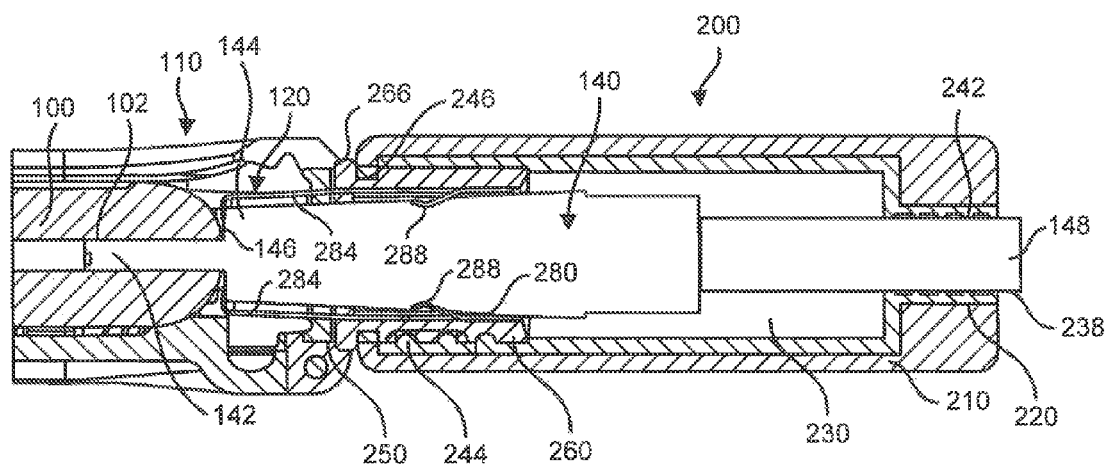
FIG. 2H shows a sectional view of the connector and reciprocal connector attached to a port of the electronic device.

FIG. 2A-2H illustrate a sealing connector 200 for sealing an aperture 120 of case 110. FIG. 2A shows a perspective view of a front the sealing connector 200. FIG. 2C shows a cross-sectional view of the sealing connector 200. FIG. 2D shows an exploded view of the sealing connector 200, case 110, and reciprocal connector assembly 140. FIG. 2E shows the sealing connector 200 in an open configuration. FIG. 2F shows a sectional view of the lower portion of the sealing connector 200. FIG. 2G shows the sealing connector 200 in an open configuration with the reciprocal connector assembly 140 positioned in an interior of connector assembly 200. FIG. 2H shows a sectional view of the sealing connector 200 and reciprocal connector assembly 140 attached to the electronic device 100.

Sealing connector 200 includes sleeve 210. Sleeve 210 has in interior cavity 218, a first opening 220 at a first end of sealing connector 200 and a second opening 222 opposite the first opening at a second end of the sealing connector. Sleeve 210 includes a living hinge 212 along one side of sleeve 210, allowing sleeve 210 to move between a closed configuration, as illustrated in FIGS. 2A and 2B, and an open configuration, as illustrated in FIGS. 2E and 2G. A latch 214 is seated against a corresponding interface 216 to secure the sleeve 210 in the closed configuration. Latch 214 and sleeve 210 are illustratively formed from a resilient material, such as a plastic, that allow the end of latch 214 to flex away from the interface 216, allowing sleeve 210 to move from the closed configuration to the open configuration.

Sealing connector 200 includes a gasket 230 for sealing an interior of sealing connector 200. Gasket 230 is illustratively positioned at least partially in interior cavity 218 of sealing connector 210. Gasket 230 includes an upper portion 232 and a lower portion 234, which in some exemplary embodiments are flexibly connected by living hinge 235. In other exemplary embodiments, upper portion 232 and lower portion 234 are not directly connected.

Gasket 230 includes an interior cavity 236, a first opening 238 proximate first opening 220 of the sleeve 210, and second opening 240 proximate the second opening 222 of the sleeve 210. Interior cavity 236 is configured to receive at least a portion of reciprocal connector assembly 140 as described in more detail below. First opening 238 includes a plurality of resilient ridges 242 configured to contact a cable 148 of reciprocal connector assembly 140 to fluidly seal the first opening 238. Second opening 240 includes a plurality of resilient ridges 244 configured to contact corresponding channels 262 of receiver 260 to fluidly seal the second opening 236. Gasket 230 illustratively includes O-ring 246. In some exemplary embodiments, O-ring 246 is formed as part of gasket 230. In other embodiments, O-ring 246 is not directly attached to gasket 230. O-ring 246 is illustratively received into O-ring channel 264 of receiver 260. O-ring 246 is configured to contact a wall of sleeve 210 to fluidly seal the second opening 222 of sleeve 210.

Sealing connector 200 includes a seal 250. Seal 250 is attached to front face 266 of receiver 260 with a suitable adhesive. As illustrated in FIG. 2H, seal 250 interfaces with the receiver 260 and case 110 to fluidly seal the aperture 120 containing device connector 102. In this way, reciprocal connector assembly 140 can be provided with a waterproof connection to device connector 102 of portable electronic device 100, and can be used to, for example, charge electronic device 100 or exchange data electronically with electronic device 100.

Figure 3A:
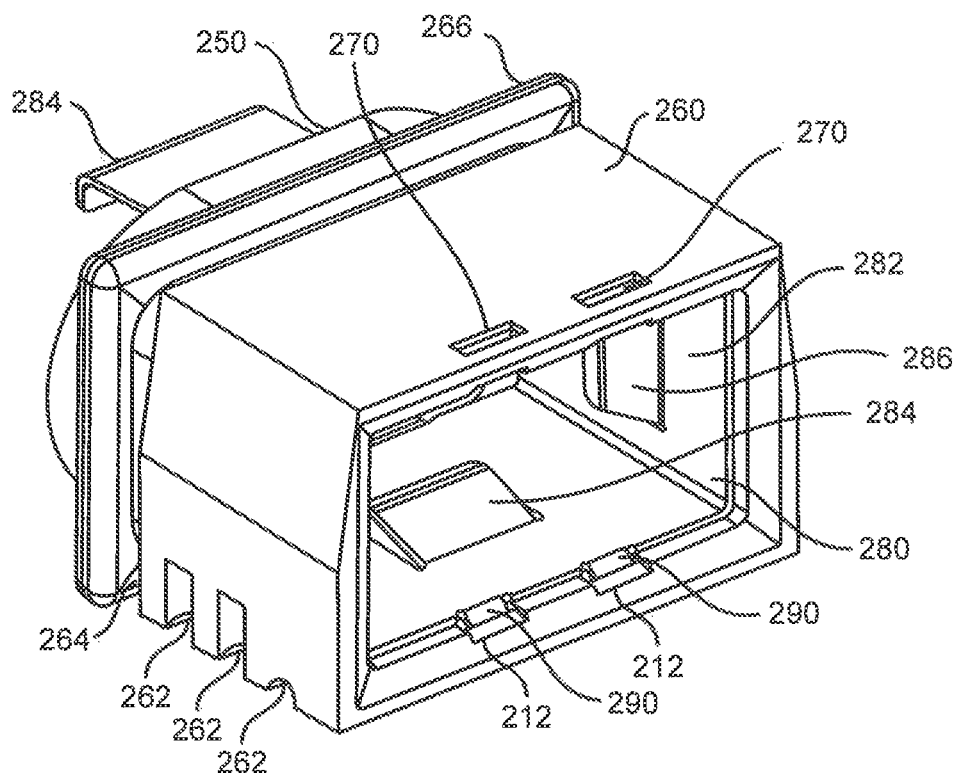
FIG. 3A shows an exemplary seal, receiving member, and orientation member of the connector of FIG. 2A.
Figure 3B:
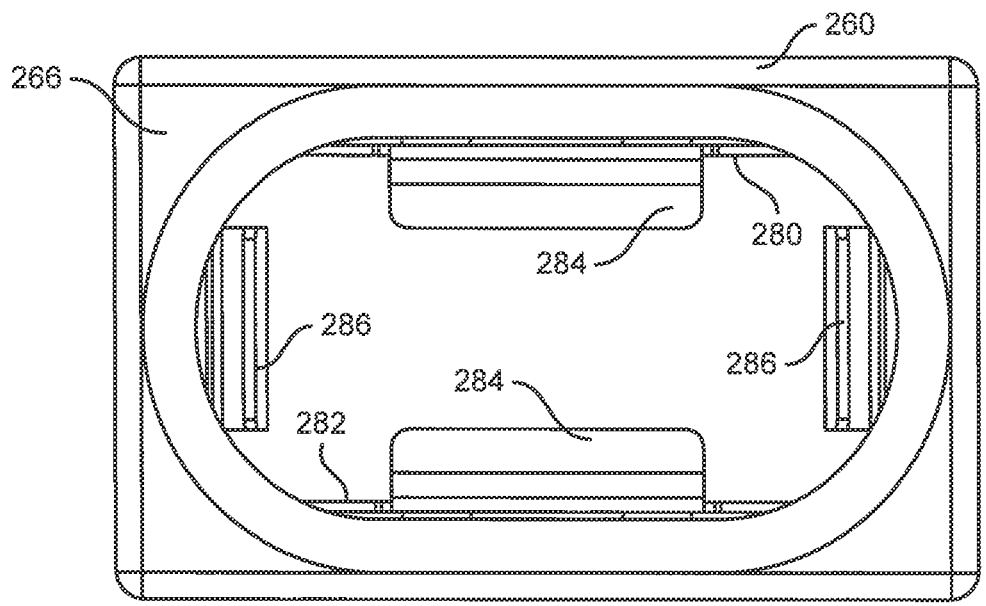
FIG. 3B shows an end view of the receiving member, and orientation member of FIG. 3A.

Referring next to FIG. 3A, an exemplary seal 250, receiver 260, and orientation member 280 are illustrated. FIG. 3B illustrates an end view of receiver 260 and orientation member 280.

Sealing connector 200 includes receiver 260. Receiver 260 includes channels 262 for receiving resilient ridges 244 of gasket 230 and O-ring channel 264 for receiving O-ring 246. Receiver 260 further includes front face 266 onto which seal 250 is adhered. An interior 268 of receiver 260 is configured to receive at least a portion of orientation member 280. Interior 268 further includes a plurality of ridges 270 configured to receiving locking tabs 288 of orientation member 280.

Figure 4:
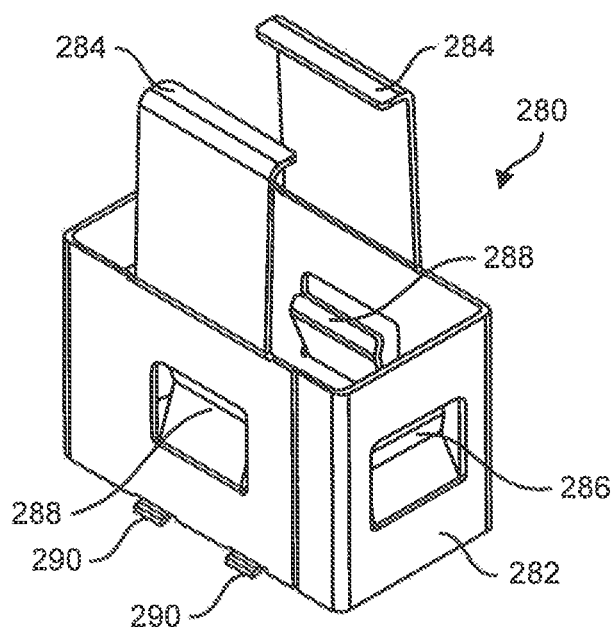
FIG. 4 shows a perspective view of an exemplary orientation member of the connector of FIG. 2A.

FIG. 4 shows a perspective view of an exemplary orientation member 280 of the connector of FIG. 2A. Orientation member 280 is positioned in receiver 260 and held in place by a plurality of locking tabs 290 that snap behind ridges 270 of receiver 260.

Orientation member 280 illustratively includes a hollow body member 282 for receiving at least a portion of reciprocal connector assembly 140 and orienting reciprocal connector 142 such that is can be inserted through aperture 120 into device connector 102 of portable electronic device 100. In the exemplary embodiment illustrated in FIG. 4, the hollow body member 282 has a substantially rectangular cross-section.

The depth of insertion of the reciprocal connector assembly 140 is limited a pair of L-shaped depth arms 284. When reciprocal connector assembly 140 is fully inserted into orientation member 280, depth arms 284 contact a face portion 146 of backshell 144 and prevent further forward movement of backshell 144.

Orientation member 280 further includes first aligning tabs 286 and second aligning tables 288, each formed from a resilient material such as a metal. As the reciprocal connector assembly 140 is inserted into orientation member 280, first alignment tabs 286 contact a first pair of opposing sides of backshell 144 and second alignment tabs 288 contact a second pair of opposing sides of backshell 144. First alignment tabs are configured to center and hold backshell 144 along a first axis within orientation member 280 and second alignment tabs are configured to center and hold backshell 144 along a second axis within orientation member 280.

Figure 5A:
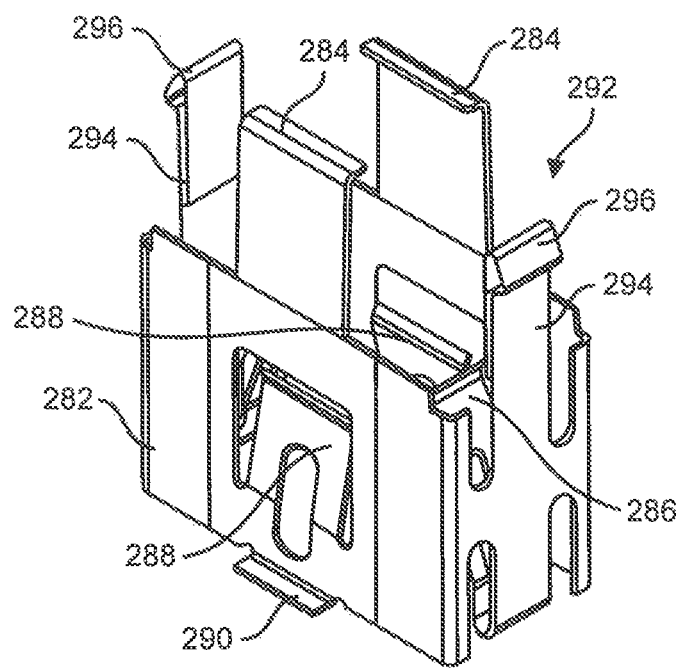
FIG. 5A shows a perspective view of another exemplary orientation member of the connector of FIG. 2A.
Figure 5B:
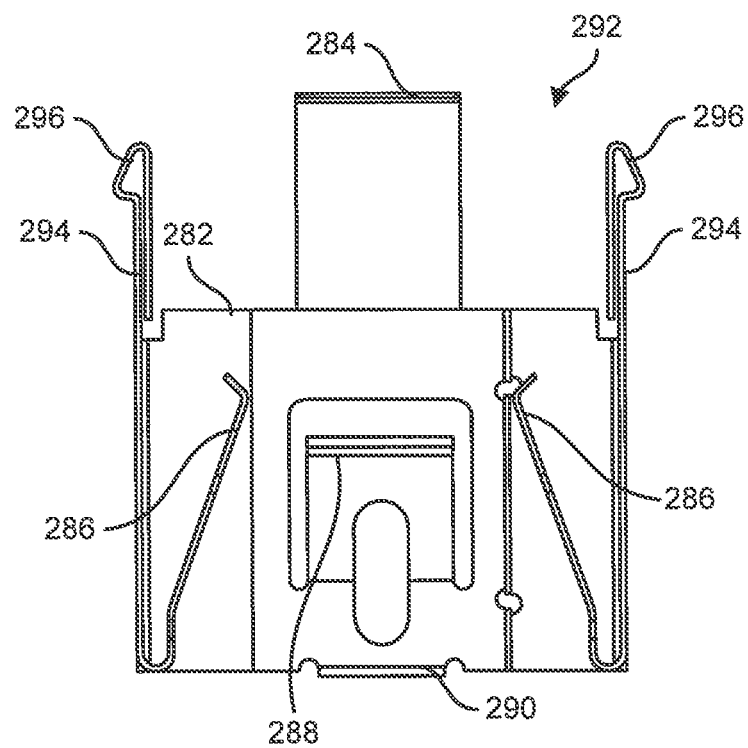
FIG. 5B shows a sectional view of the exemplary orientation member of FIG. 5A.
Figure 5C:
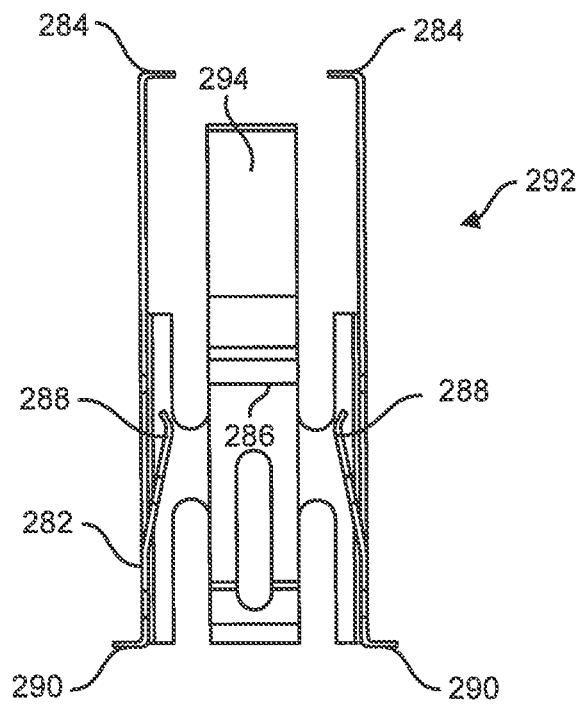
FIG. 5C shows a side view of the exemplary orientation member of FIG. 5A.

FIG. 5A shows a perspective view of another exemplary orientation member 292. In some exemplary embodiments, connector 200 includes orientation member 292 in place of orientation member 280. Orientation member 292 is similar to orientation member 280 as illustrated in FIG. 4 and similar parts are indicated with similar reference numbers. FIG. 5B shows a sectional view of orientation member 292. FIG. 5C shows a side view of orientation member 292. In the exemplary embodiment illustrated in FIGS. 5A-5C, the hollow body member 282 has a substantially rectangular cross-section.

Orientation member 292 includes attachment tabs 294 extending from hollow body member 282 each formed from a resilient material such as a metal. Each attachment tab 294 terminates in an attachment end 296. As illustrated in FIG. 7B, each attachment end 296 is configured to be received within a corresponding receiving slot 124 in the interior surface 122 of aperture 120 and removably secure orientation member 292 to case 110.

Figure 6A:
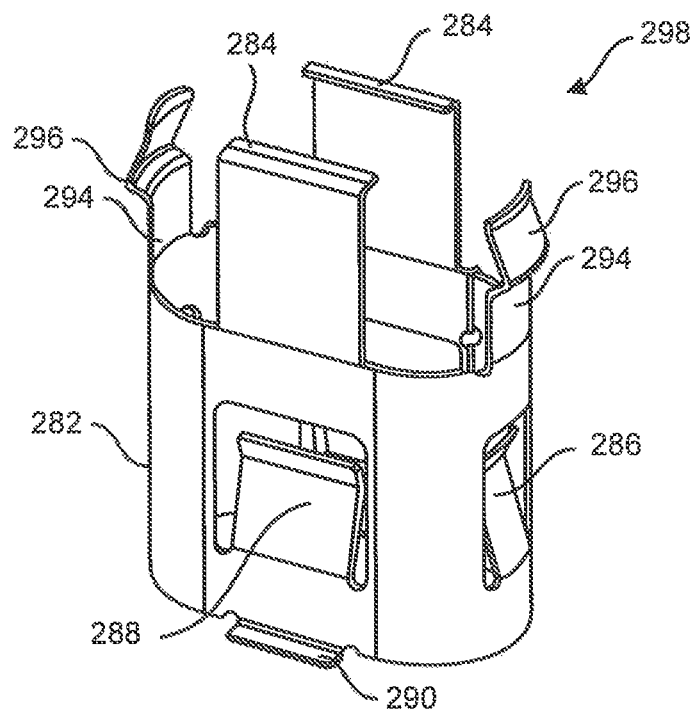
FIG. 6A shows a perspective view of still another exemplary orientation member of the connector of FIG. 2A.
Figure 6B:
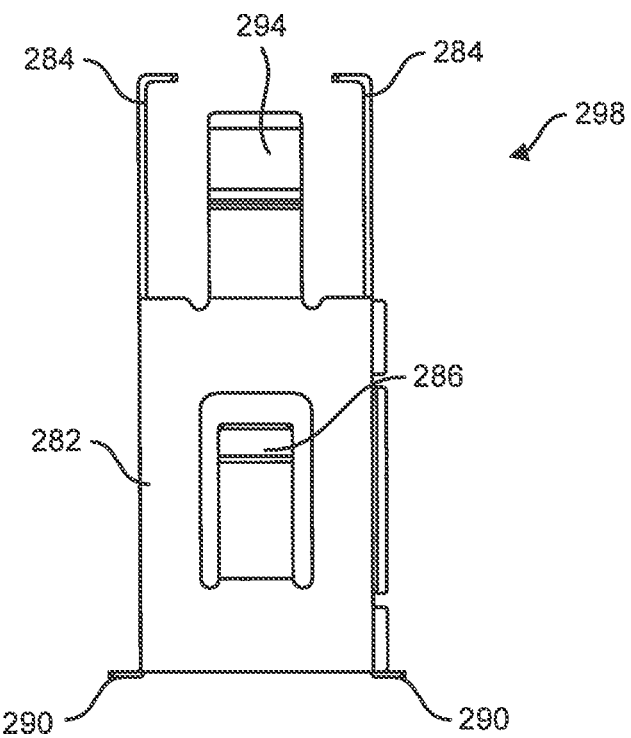
FIG. 6B shows a side view of the exemplary orientation member of FIG. 6A.

FIG. 6A shows a perspective view of still another exemplary orientation member 298 of the connector 200 of FIG. 2A. In some exemplary embodiments, connector 200 includes orientation member 298 in place of orientation member 280. Orientation member 298 is similar to orientation member 280 as illustrated in FIG. 4 and to orientation member 292 as illustrated in FIGS. 5A-5C and orientation. FIG. 6B shows a side view of the orientation member 298. Similar parts are indicated with similar reference numbers. In the exemplary embodiment illustrated in FIGS. 6A and 6B, the hollow body member 282 has a cross-section with substantially rounded edges.

Figure 7A:
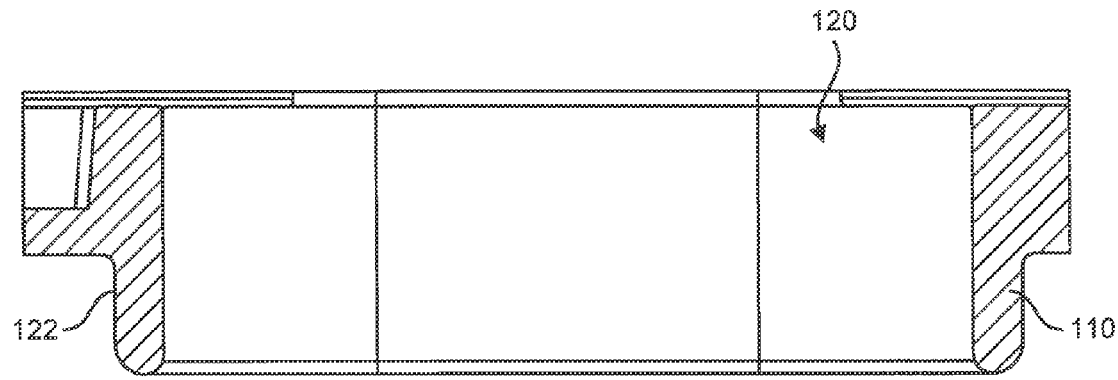
FIG. 7A shows a sectional view of an exemplary port of a portable electronic device for receiving a connector including the orientation member of FIG. 4.
Figure 7B:
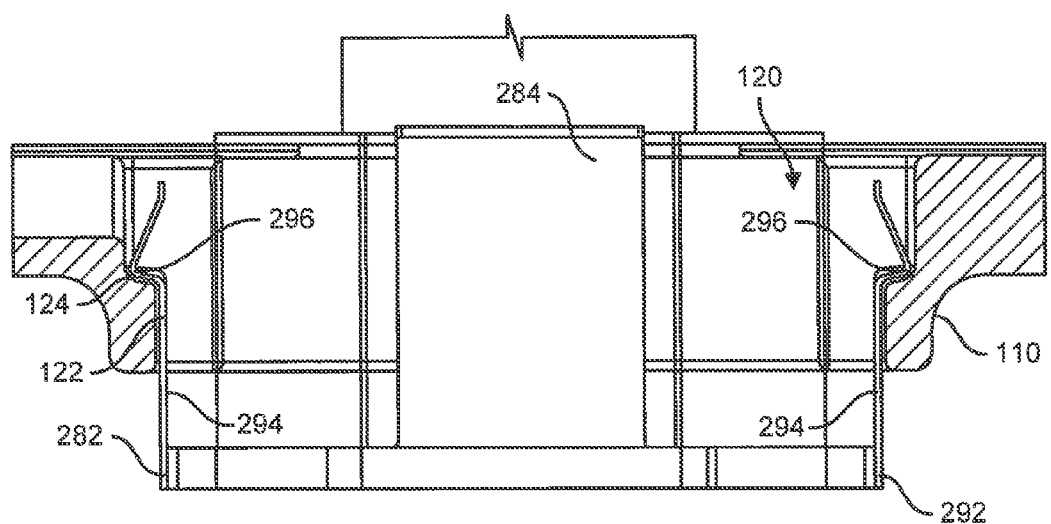
FIG. 7B shows a sectional view of another exemplary port of a portable electronic device receiving the orientation member of FIG. 6A.

FIG. 7A shows a sectional view of an exemplary aperture 120 including an interior surface 122 of a portable electronic device for receiving a connector including the orientation member 280 of FIG. 4. FIG. 7B shows a sectional view of another exemplary port of a portable electronic device receiving the orientation member 294 of FIG. 6A. As indicated in FIG. 7B, interior surface 122 of aperture 120 includes receiving slots 124 configured to receive and releasably secure attachment ends 296 of attachment arms 294.

Referring again to FIG. 2D, in one exemplary embodiment, the sealing connector 200 is assembled by placing the orientation member 280 into the receiver 260. Locking tabs 290 and ridges 270 secure the orientation member in position in the interior 268 of receiver 260. The gasket 230 is placed in to the interior cavity 218 of plastic sleeve 210 while plastic sleeve 210 is in the open configuration. Gasket 230 may be secured to the plastic sleeve 210 with a suitable adhesive. O-ring 246 of gasket 230 is then positioned in O-ring channel 264 of receiver 260, and receiver 260 is positioned in the interior cavity 236 of gasket 230 such that the plurality of ridges 244 of gasket 240 are received within channels 262 of receiver 260. Receiver 260 may be secured to the gasket 230 with a suitable adhesive. The seal 250 is then secured to a front face 266 of receiver 260 with a suitable adhesive.

Referring next to FIG. 2G, the reciprocal connector 142 of reciprocal connector assembly 140 is inserted through the interior of hollow body member 282 of orientation member 280 (or hollow body member 282 of orientation member 292 or orientation member 298) until the face portion 146 is positioned against depth arms 284. Reciprocal connector is positioned in the orientation member 280 by aligning tabs 286 and aligning tabs 288. Depth arms 284 prevent reciprocal connector assembly 140 from pushed too far through sealing connector 200. The sealing connector 200 is then closed and latch 214 of sleeve 210 is secured. Referring to FIG. 2H, a user then inserts reciprocal connector 142 into aperture 120 and operably connects reciprocal connector 142 into device connector 102 of portable electronic device 100. Gap 123 is sealed by seal 250 positioned in aperture 120 of case 110, as illustrated in FIG. 2H.

If an orientation member with attachment tabs 294 (see FIGS. 5A-6B) is used, attachment ends 296 are received within receiving slots 124 of interior surface 122 of aperture 120 to releasably secure the sealing connector 200 to case 110.

The above figures may depict exemplary configurations for an apparatus of the disclosure, which is done to aid in understanding the features and functionality that can be included in the housings described herein. The apparatus is not restricted to the illustrated architectures or configurations, but can be implemented using a variety of alternative architectures and configurations. Additionally, although the apparatus is described above in terms of various exemplary embodiments and implementations, it should be understood that the various features and functionality described in one or more of the individual embodiments with which they are described, but instead can be applied, alone or in some combination, to one or more of the other embodiments of the disclosure, whether or not such embodiments are described and whether or not such features are presented as being a part of a described embodiment. Thus the breadth and scope of the present disclosure, especially in any following claims, should not be limited by any of the above-described exemplary embodiments.

Terms and phrases used in this document, and variations thereof, unless otherwise expressly stated, should be construed as open ended as opposed to limiting. As examples of the foregoing: the term "including" should be read to mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. Additionally, where a range is set forth, each of the upper and lower limits of the stated range are inclusive of all of the intermediary units therein.

The foregoing description is intended to illustrate but not to limit the scope of the disclosure, which is defined by the scope of the appended claims. Other embodiments are within the scope of the following claims.

What is claimed:

1. A connector for connecting a reciprocal connector to a device connector of a portable electronic device accessed through an aperture of a protective case, the connector comprising:
    a sleeve for receiving at least a portion of the reciprocal connector;
    an orientation member including a hollow body member configured to receive at least a portion of the reciprocal connector, the orientation member including one or more depth arms configured to contact a face portion of the reciprocal connector and resist movement of the reciprocal connector in a first direction; and
    a seal positioned between the sleeve and the device connector, the seal fluidly sealing the aperture of the protective case.

2. The connector of claim 1, wherein the hollow body member has a substantially rectangular cross-section.

3. The connector of claim 1, wherein the orientation member further comprises one or more attachment tabs extending from the hollow body member, each attachment tab including an attachment end configured to be received within a corresponding receiving slot of the aperture to removeably secure the connector to the case.

4. The connector of claim 1, further comprising a receiver surrounding the orientation member, the seal being attached to a front face of the receiver.

5. The connector of claim 1, further comprising a gasket at least partially positioned in an interior of the sleeve, the gasket configured to fluidly seal the interior of the sleeve when the sleeve is in a closed configuration.

6. The connector of claim 5, wherein the gasket comprises a plurality of resilient ridges configured to contact a cord of the reciprocal connector to fluidly seal the interior of the sleeve when the sleeve is in a closed configuration.

7. The connector of claim 5, wherein the gasket comprises an O-ring configured to be positioned around at least a portion of the reciprocal connector, the O-ring configured to fluidly seal the interior of the sleeve when the sleeve is in a closed configuration.

8. The connector of claim 1, wherein the orientation member further comprises a first pair of aligning tabs configured to contact a portion of the reciprocal connector when the reciprocal connector is received by the orientation member, the first pair of aligning tabs further configured to center and hold the contacted portion of the reciprocal connector along a first axis within the hollow body member of the orientation member.

9. The connector of claim 8, wherein the orientation member further comprises a second pair of aligning tabs configured to contact a second portion of the reciprocal connector when the reciprocal connector is received by the orientation member, the second pair of aligning tabs further configured to center and hold the second contacted portion of the reciprocal connector along a second axis within the hollow body member of the orientation member.

10. The connector of claim 9, wherein the second axis is perpendicular to the first axis.

11. The connector of claim 1, wherein the sleeve includes a living hinge configured to allow the sleeve to move between an open configuration for receiving the portion of the reciprocal connector and a closed configuration for fluidly sealing an interior of the sleeve.

12. The connector of claim 11, further comprising a latch for reversibly securing the sleeve in the closed configuration.

13. A connector for positioning a reciprocal connector in a predetermined position, the connector comprising:
    a hollow body member having an interior configured to receive at least a portion of the reciprocal connector within the interior; and
    one or more depth arms extending from the hollow body member, the depth arms configured to contact a face portion of the reciprocal connector and resist movement of the reciprocal connector in a first direction;
    a first pair of aligning tabs configured to contact a first portion of the reciprocal connector when the reciprocal connector is received in the interior, the first pair of aligning tabs further configured to center and hold the first portion of the reciprocal connector along a first axis within the interior of the hollow body member; and
    a second pair of aligning tabs configured to contact a second portion of the reciprocal connector when the reciprocal connector is received in the interior, the second pair of aligning tabs further configured to center and hold the second portion of the reciprocal connector along a second axis within the interior of the hollow body member.

14. The connector of claim 13, wherein the second axis is perpendicular to the first axis.

15. The connector of claim 13, wherein the hollow body member has a substantially rectangular cross-section.

16. The connector of claim 13 further comprising one or more attachment tabs extending from the hollow body member.

17. The connector of claim 16, wherein each attachment tab terminates in an end having a substantially triangular cross-section.

* * * * *